Patented Sept. 21, 1954

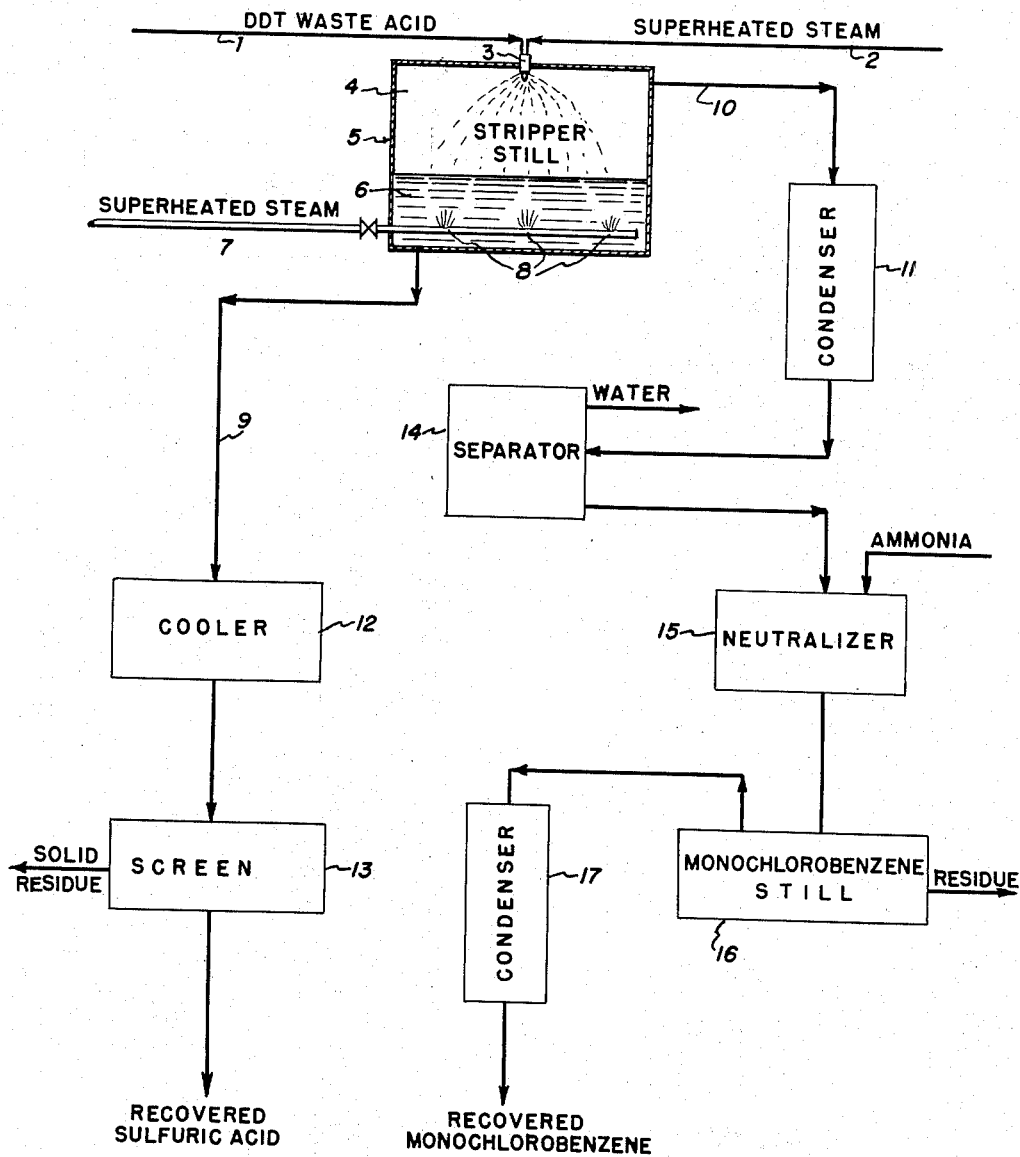

2,689,871

UNITED STATES PATENT OFFICE 2,689,871

MONOCHLOROBENZENE RECOVERY FROM DDT WASTE ACID

Richard K. Rathmell and Francis C. Zevnik, Metuchen, N. J., assignors to E. I. du Pont de Nemours & Company, Wilmington, Del., a corporation of Delaware Application March 23, 1951, Serial No. 217,218

2 Claims. (Cl. 260—650)

1

This invention relates to the recovery of values from waste products of the production of DDT. It is more specifically directed to processes wherein monochlorobenzene is recovered from a waste sulfuric acid containing monochlorobenzene sulfonic acid by heating the waste acid to a temperature above about 160° C. by mixing it with superheated steam and spraying the mixture into the vapor space of a distillation zone which contains a body of aqueous sulfuric acid maintained at a temperature above about 180° C.

DDT [2,2-bis(p-chlorophenyl)-1,1,1-trichloroethane] is commonly prepared by the condensation of monochlorobenzene with chloral in the presence of strong sulfuric acid. In addition to serving as a condensing agent, the sulfuric acid also acts, unfortunately, to sulfonate the monochlorobenzene reactant. The waste sulfuric acid from the reaction, after separation from the desired product, therefore contains rather large amounts of monochlorobenzene sulfonic acid.

It is an object of this invention to provide processes for the recovery of monochlorobenzene from a waste sulfuric acid containing monochlorobenzene sulfonic acid. A further object is to provide processes for removing monochlorobenzene sulfonic acid from a waste sulfuric acid containing it whereby the acid values are more readily usable. Still further objects will become apparent hereinafter.

The foregoing and other objects of this invention are attained by the use of processes involving first heating a waste acid containing monochlorobenzene sulfonic acid to a temperature above about 160° C. by mixing the waste acid with superheated steam. The heated mixture is sprayed or rapidly dispersed into the vapor space of a distillation zone above a body of hot aqueous sulfuric acid. Monochlorobenzene is stripped from the waste acid in the distillation zone and is withdrawn from the zone as a vapor along with water vapor and subsequently recovered by condensation and separation from the water.

The recovered sulfuric acid can readily be fortified with sulfur trioxide and be used together with the recovered monochlorobenzene if desired in the production of further quantities of DDT, or, it can be used for other purposes, as for example, in the manufacture of fertilizers.

The processes of the invention will be better understood by reference to the drawing in which a typical process is illustrated by means of a modified flowsheet.

DDT waste acid is introduced thru inlet line 1 and superheated steam thru inlet line 2 into a

2 mixing and spray means 3. The resulting mixture of DDT waste acid and superheated steam is then introduced as a spray into the vapor space 4 of a distillation zone identified in the drawing as stripper still 5.

The stripper still contains a liquid body of hot aqueous sulfuric acid 6 and is equipped with an inlet line 7 provided with a plurality of ports 8 for introducing superheated steam, an outlet line 9 for discharging the liquid, and a vapor outlet line 10.

The DDT waste acid introduced thru line 1 is the acid phase resulting from the condensation of chloral and monochlorobenzene in sulfuric acid. The acid has a sulfuric acid strength of about 90 to 98% $H_2SO_4$ on an organic free basis, tho in some instances this may run a little lower, say 85 to 90%. The total acidity, as $H_2SO_4$, is normally in the order of 60 to 80%.

The DDT waste acid also contains monochlorobenzene sulfonic acid in a substantial amount and this generally varies from say 25 to 30% up to 50% or more. The precise amount of the monochlorobenzene sulfonic acid will depend upon the extent to which the reaction has effected sulfonation of the monochlorobenzene instead of condensation with chloral.

The superheated steam is introduced thru line 2 in amount and at a temperature sufficient to heat the DDT waste acid sprayed into vapor space 4 to a temperature above about 160° C. but not ordinarily in excess of about 260° C., and preferably from 180 to 220° C. The amount and temperature of steam needed will depend upon the rate and temperature of the DDT waste acid feed. As a specific illustration, if the DDT waste acid is fed at a temperature of 40° C. and the superheated steam at 230° C. and a gauge pressure of 70 lbs. per square inch, then there is required in the order of 10 lbs. of the steam for each 100 lbs. of waste acid to effect the required heating of the waste acid.

The DDT waste acid and superheated steam are brought together so as to provide rapid intimate mixing by means of vigorous agitation. The mixing can be suitably attained by use of so-called jet mixers or other conventional equipment adapted for effecting rapid intimate mixing of liquids; and then the mixture can be fed to a nozzle and dispersed into the vapor space of the distillation zone. However, because of the highly corrosive nature of the hot mixture, it is preferred to effect the mixing at the immediate exit of the spray nozzle as by means of a two liquid spray nozzle so that there will be a minimum contact of the hot mixture with the mixing means.

The liquid body of hot aqueous sulfuric acid 6 in the stripper still is maintained at a temperature above about 180° C. but not ordinarily in excess of 260° C., and preferably from 180 to 220° C. These temperatures are maintained by supplying heat to the hot aqueous sulfuric acid as required, preferably as shown in the drawing by the introduction of superheated steam thru line 7.

During the heating which occurs in the mixing step and in the stripper still, the monochlorobenzene sulfonic acid breaks down and monochlorobenzene is stripped as a gas from the waste acid. This gaseous monochlorobenzene passes thru line 10 along with water vapor to condenser 11. Sulfuric acid stripped from the monochlorobenzene sulfonic acid augments the body of aqueous sulfuric acid in the stripper still.

There is a considerable formation of tarry material in the stripper still and it is desirable to effect agitation to maintain this tar in suspension. The agitation can be suitably provided by the introduction of superheated steam thru ports 8. Other means of agitation such as a mechanical motor driven agitator can also be used if desired.

The sulfuric acid is run from the stripper to cooler 12 after substantially no monochlorobenzene sulfonic acid remains in it. The cooler preferably is supplied with an agitator. On cooling, part of the tar solidifies into hard coke-like particles.

After cooling, the sulfuric acid is passed to a screen 13, or filter, to remove insolubles as solid residue.

The recovered sulfuric acid from the screening or filtering step will contain considerably more water than the original DDT waste acid and may have an acid strength of say 70 to 80% $H_2SO_4$ or thereabout. It can be used without further treatment for various commercial uses. It may, if desired, be fortified by passing sulfur trioxide into it. Sulfuric acid made by fortification can then be used, for example, as a condensing agent for the reaction of further amounts of chloral and monochlorobenzene.

The condensate from condenser 11 passes into separator 14. In the separator, the condensate is allowed to settle and form two layers. The upper, water layer is decanted off leaving a crude slightly acid monochlorobenzene as a lower layer.

The crude monochlorobenzene is withdrawn to neutralizer 15 where it is neutralized by use of a trace of aqueous ammonia. Other alkalis may of course be used if desired.

The crude neutralized monochlorobenzene is then refined by distillation in monochlorobenzene still 16. The distilled monochlorobenzene is condensed in condenser 17. The refined monochlorobenzene thus produced is ordinarily slightly milky because of the presence of a trace of water which can be removed if desired. Ordinarily, however, the water does not interfere with the use of the monochlorobenzene and it can be returned to the condensation with chloral in the presence of sulfuric acid.

In order that the invention may be better understood, reference should be had to the following illustrative example:

Example

Into a stripper still equipped at the top with a two liquid spray nozzle, near the bottom with three inlet ports for superheated steam, and other features as shown in the drawing, DDT waste acid and superheated steam are fed simultaneously and continuously thru the spray nozzle for a period of two hours. The spray nozzle effects a rapid and intimate mixing of the steam and waste acid.

The steam is fed thru the spray nozzle at a temperature of about 230° C., at a gauge pressure of 70 lbs. per square inch, and at a rate of 6.5 to 7.5 parts by weight per minute. The DDT waste acid is fed to the spray nozzle at a rate of 80 to 85 parts by weight per minute.

The mixing effected by the spray nozzle heats the waste acid to about 190° C. As the spray passes thru the vapor space in the still, a portion of the monochlorobenzene associated with the waste acid is liberated as a gas and passes from the still along with water vapor thru a water cooled condenser.

The hot waste acid falls to the bottom of the still as a liquid. When about 1500 parts by weight of the acid has been collected, superheated steam (230° C., 70 lbs. per square inch gauge) is introduced thru the aforementioned inlet ports near the bottom of the stripper still. The superheated steam is so introduced at the rate of about 6.5 to 7.5 parts by weight per minute. The steam acts to cause hydrolysis of monochlorobenzene sulfonic acid, to effect agitation of the acid, and to maintain the temperature of the acid at about 200° C.

At the end of the two-hour waste acid charging period, the feed of waste acid and superheated steam thru the spray nozzle is stopped. Steam sparging of the liquid body of acid in the still is continued however to remove residual monochlorobenzene, the total steam input thru the inlet ports being gradually increased to a rate of about 15 parts by weight per minute.

The rate of monochlorobenzene liberation drops rapidly during the sparging of the stripped acid by introduction of superheated steam thru the inlet ports. After about one hour of such sparging, the rate of monochlorobenzene is small and the steam introduction is stopped.

The monochlorobenzene and water leaving the stripper still during the above operations is condensed and the condensate passes into a separator. In the separator, the water forms an upper layer, the monochlorobenzene a lower layer. About 2000 parts by weight of water and 2260 parts by weight of monochlorobenzene are obtained. The water layer is discarded.

The monochlorobenzene layer is slightly acidic. It is neutralized by mixing it with a solution containing 19 parts by weight of aqua ammonia (26° Bé.) per 100 parts by weight of water. About 10 parts by weight of the dilute ammonia solution are used for each 80 parts by weight of the condensed monochlorobenzene. The wash water is then separated and the monochlorobenzene is again washed with dilute aqueous ammonia, ammonia being added in the second wash until the water layer has pH 8.0. The monochlorobenzene is then washed twice with water.

The neutralized monochlorobenzene is then distilled. Approximately 94% of the monochlorobenzene product charged to the monochlorobenzene distillation still is recovered as monochlorobenzene equivalent to commercial grade, the balance being predominantly a high boiling residue.

The foregoing detailed description has been given for clearness of understanding only and no

We claim:

1. In a process for the recovery of monochlorobenzene from a waste sulfuric acid containing monochlorobenzene sulfonic acid, the steps comprising heating said waste acid to a temperature above 160° C. by rapidly mixing with superheated steam, immediately spraying the mixture into the vapor space of a distillation zone which contains a body of aqueous sulfuric acid maintained at a temperature above 180° C., withdrawing a vaporized mixture of monochlorobenzene and water from the distillation zone, condensing the withdrawn vapors, and separating the condensed monochlorobenzene from the condensed water.

2. In a process for the recovery of monochlorobenzene from a waste sulfuric acid containing monochlorobenzene sulfonic acid, the steps comprising heating said waste acid to a temperature of 180° C. to 220° C. by rapidly mixing it with superheated steam, immediately spraying the mixture into the vapor space of a distillation zone which contains a body of aqueous sulfuric acid maintained at a temperature of 180° C. to 220° C. while introducing superheated steam into said body of aqueous sulfuric acid whereby monochlorobenzene is vaporized, withdrawing a vaporized mixture of monochlorobenzene and water from the distillation zone, condensing the withdrawn vapors, and separating the condensed monochlorobenzene from the condensed water.

References Cited in the file of this patent

UNITED STATES PATENTS

| Number | Name | Date |
| --- | --- | --- |
| 374,077 | Mathieu | Nov. 29, 1887 |
| 1,292,948 | Zeisberg | Jan. 28, 1919 |
| 1,755,768 | Busching | Apr. 22, 1930 |
| 1,796,108 | Kalischer et al. | Mar. 10, 1931 |
| 2,151,990 | Ruys | Mar. 28, 1939 |
| 2,350,609 | Hachmuth | June 6, 1944 |
| 2,353,441 | Brown | July 11, 1944 |

OTHER REFERENCES

Manske: Abstract of application Serial No. 777,102, published August 1, 1950, v. 637, O. G. 256–7.